D. C. DODGE.
MAGNETO TESTER.
APPLICATION FILED MAR. 22, 1918.
1,296,932.
Patented Mar. 11, 1919.
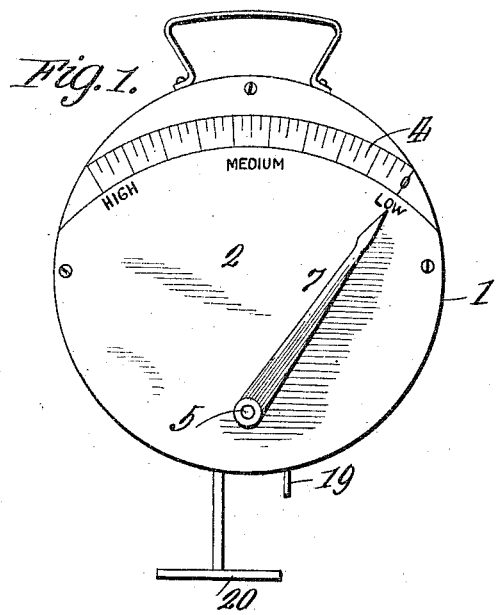
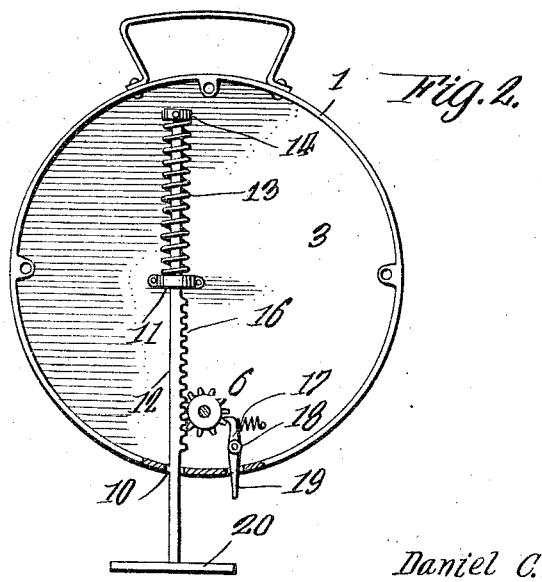
INVENTOR
Daniel C. Dodge
WITNESSES
BY
ATTORNEY

---

UNITED STATES PATENT OFFICE.

DANIEL C. DODGE, OF BOONE, IOWA.

MAGNETO-TESTER.

1,296,932.   Specification of Letters Patent.   Patented Mar. 11, 1919.

Application filed March 22, 1918.   Serial No. 224,034.

*To all whom it may concern:*

Be it known that I, DANIEL C. DODGE, a citizen of the United States, residing at Boone, in the county of Boone and State of Iowa, have invented certain new and useful Improvements in Magneto-Testers, of which the following is a specification.

This invention relates to measuring instruments, and more especially to testers; and the object of the same is to produce an instrument of this character having an index moving over a dial and by means of which the strength of a magnet in an automobile magneto or any permanent type magnet may be tested.

Details of the preferred construction of my invention are set forth below and shown in the drawings, wherein:—

Figure 1 is a front elevation of this device complete, and

Fig. 2 is a vertical section showing the internal mechanism.

The casing comprising an annulus 1 and a front 2 and back 3 connected thereby, the front having a scale 4 mounted on an arc around a point which constitutes the shaft 5 of a gear pinion 6 mounted within the casing, and on the front end of said shaft is an index 7 whose tip points to the scale. The latter is inscribed with graduation marks and by preference the words "low" "medium" and "high" and in addition to these the markings of the scale may be numbered although this is not shown.

Mounted in upright guides 10 and 11 within the casing is a rack bar 12 whose teeth 16 engage the pinion 6, and a spring 13 bearing on the upper guide encircles the bar beneath a head 14 at the upper end thereof so as to hold said bar normally raised but will yield in order to let the rack bar descend. When it does so it turns the pinion 6, and the same moves past a pawl 17 pivoted at 18 within the casing with its outer end projecting at 19 outside the same to constitute a handle by which this pawl may be manipulated. The lower end of the rack bar where it projects beneath the casing carries a head 20 which is by preference of soft metal so as to be attracted by any magnet. When this head is placed in juxtaposition to said magnet and held there by hand for a moment, the strength of the magnet is immediately indicated on this device. That is to say, the extent to which the magnet moves the rack bar downward and overcomes the spring 13, is indicated by the degree to which the index 7 is moved over the scale 4. If the operator desires to carry this instrument to some distance and still have this point recorded thereon, he sets the pawl 17 so as to engage the pinion as seen in Fig. 2; but as soon as he moves the outer end 19 of this pawl in the opposite direction, the inner end 17 disengages the pinion and the parts are restored to their normal position by the expansion of the spring 13 as will be understood. The parts are of any desired materials and proportions, and details are not essential.

What is claimed as new is:—

1. In a magneto tester, the combination with a casing, a rack bar slidably mounted therein and projecting beyond the casing and having a soft metal head at its outer end adapted to serve as the armature of a magnet, and a pinion rotated by movements or said rack bar; of indicating mechanism set by the turning of said pinion.

2. In a magneto tester, the combination with a casing, a rack bar slidably mounted therein and projecting beyond the casing and having a soft metal head at its outer end adapted to serve as the armature of a magnet, and a pinion rotated by movements of said rack bar; of an index fast on the shaft of said pinion and standing over the front face of the casing, and a scale marked on said face and with which the tip of said index coacts.

3. In a tester of the class described, the combination with a casing having an arcuate scale marked on its front face, a shaft journaled through the front and rear walls of said casing and carrying a pinion between them, and an index fast on the front end of said shaft and with its tip coacting with said scale; of guides in the casing, a rack bar slidably mounted in said guides and having a head at its lower projecting end and another head at its upper end, and an expansive spring coiled on the bar between said upper head and the upper guide, for the purpose set forth.

4. In a tester of the class described, the combination with a casing having an arcuate scale marked on its front face, a shaft journaled through the front and rear walls of said casing and carrying a pinion between them, and an index fast on the front end of said shaft, and with its tip coacting with said scale; of a vertically movable rack bar mounted in guides within the casing, a spring for moving it normally in one direction with certain force, a head on its outer end adapted to serve as the armature of a magnet, and a pawl pivoted within the casing with its inner end engaging said pinion and its outer end projecting outside the casing, for the purpose set forth.

In testimony whereof I affix my signature in presence of two witnesses.

DANIEL C. DODGE.

Witnesses:
J. H. MARSTON,
W. G. CROWE.

Copies of this patent may be obtained for five cents each, by addressing the "Commissioner of Patents, Washington, D. C."